United States Patent [19]

Sugaya et al.

[11] Patent Number: 4,851,933
[45] Date of Patent: Jul. 25, 1989

[54] MAGNETIC DISK APPARATUS HAVING MAGNETIC HEAD WITH PRE-ERASE GAP

[75] Inventors: Toshihiro Sugaya, Tokyo; Yuji Sakai; Takehito Yamada, both of Yokohama, all of Japan

[73] Assignee: Kabushiki Kaisha Toshiba, Kawasaki, Japan

[21] Appl. No.: 97,220

[22] Filed: Sep. 16, 1987

[30] Foreign Application Priority Data

Sep. 30, 1986 [JP] Japan .................................. 61-231858

[51] Int. Cl.⁴ ........................ G11B 15/12; G11B 5/03; G11B 5/09
[52] U.S. Cl. ......................................... 360/61; 360/48; 360/66
[58] Field of Search ........................ 360/66, 61, 63, 48

[56] References Cited

U.S. PATENT DOCUMENTS

| | | |
|---|---|---|
| 4,300,174 | 11/1981 | Harman et al. ....................... 360/66 |
| 4,499,511 | 2/1983 | Sugaya . |
| 4,631,606 | 12/1986 | Sugaya . |
| 4,633,337 | 12/1986 | Horie et al. ............................ 360/61 |
| 4,636,885 | 12/1985 | Yamada et al. . |
| 4,750,060 | 6/1988 | Nakazawa et al. .................... 360/60 |

FOREIGN PATENT DOCUMENTS

6139910 3/1984 Japan .
6139911 9/1984 Japan .

Primary Examiner—Vincent P. Canney
Attorney, Agent, or Firm—Oblon, Spivak, McClelland, Maier & Neustadt

[57] ABSTRACT

A magnetic disk adapted for use in a magnetic disk apparatus, which has a magnetic head with a pre-erase gap and a read/write gap with a predetermined spacing therebetween, and which uses a sector servo system to position the magnetic head onto a target track of the disk, is divided into a plurality of sectors each having an address field and a data field. A spacing gap having a length corresponding to the spacing between the erase and read/write gaps is formed at the beginning of each of the address and data fields. Servo information is provided at least in the spacing gap of the address field. The magnetic disk apparatus energizes the read/write and erase gaps at different timings, so that the initiation and termination of data erasing are performed prior to the initiation and termination of data writing, respectively.

12 Claims, 10 Drawing Sheets

MAGNETIC DISK APPARATUS HAVING MAGNETIC HEAD WITH PRE-ERASE GAP

BACKGROUND OF THE INVENTION

This invention relates to a magnetic disk apparatus which employs a sector servo system as the tracking servo of a magnetic head having a pre-erase gap.

When recording new data on a flexible (floppy) disk, in place of previously-recorded (old) data, the new data is simply written over the old data, i.e., without first erasing the old data.

With recent increases in the recording capacity of floppy disks, much attention has been given to the problem wherein when new data is written over old data, noise is produced as a result of imperfect erasure, or overwrite modulation occurs. In the case of a perpendicular magnetic recording medium, in particular, which has a thick magnetic layer formed thereon, it is difficult to obtain a digital recording of a good quality when data is overwritten by a ring-shaped read/write (R/W) head.

To cope with the occurrence of overwrite modulation in this type of recording medium, a recording/reproduction system has been proposed which employs a magnetic head assembly having an erase gap of greater length and width than the R/W gap which it precedes. Such a recording/reproduction system is disclosed in Japanese Laid Open Patent Publication Nos. 61-39910 and 61-39911. The R/W gap and erase gap are integrally formed in the magnetic head assembly. According to the recording/reproduction system using this magnetic head assembly a data write region is erased by the erase gap prior to data write by the R/W gap. A floppy disk employing this system is described in a paper "Barium Ferrite Perpendicular Magnetic Recording Floppy Disk" in TOSHIBA REVIEW 1985 Vol. 40 No. 13, p.p. 1115–1118.

Figure 1:
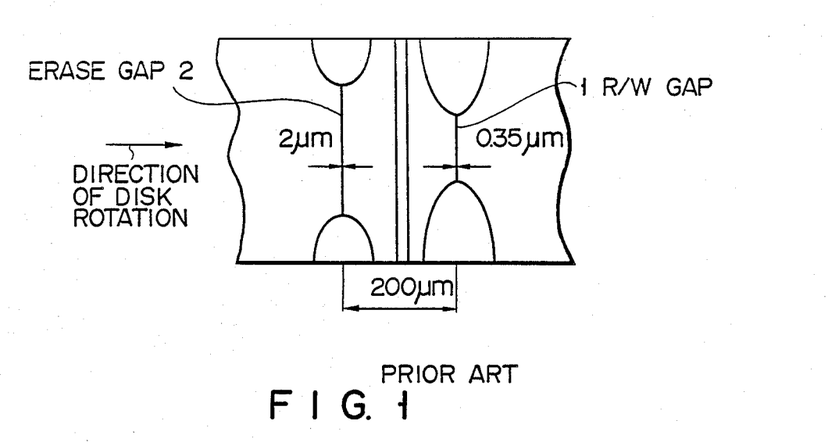
FIG. 1 shows a structure of a magnetic head having a pre-erase gap.

The head having such a pre-erase gap as described above is also known as a wide pre-erase head. This head has a structure as shown in FIG. 1. The width of a R/W gap 1 is 0.35 μm, which ensures a recording density of 35 KBPI (bits per inch). An erase gap 2 with a width of 2 μm or less is formed such that it precedes R/W gap 1 with respect to the rotational direction of the disk. The spacing between R/W gap 1 and erase gap 2 should preferably be even less, in consideration of disk formatting efficiency. On the other hand, if the spacing is too narrow, it becomes increasingly difficult to manufacture the head, and results in a decrease in the efficiency of the head. Accordingly, the spacing between those two gaps cannot be set too narrow, and so, is generally set to as little as 200 μm. With a recording density of 35 KBPI, the 200 μm spacing corresponds to about 35 bytes at the outermost track on a 3.5 inch floppy disk. When the erase gap and R/W gap are driven simultaneously, it becomes clear that the data region corresponding to the spacing between the erase gap and R/W gap cannot be erased. This necessitates the provision of an unused area or gap corresponding to the spacing between the erase and R/W gaps at a beginning portion of the data write region on the disk.

Figure 2:
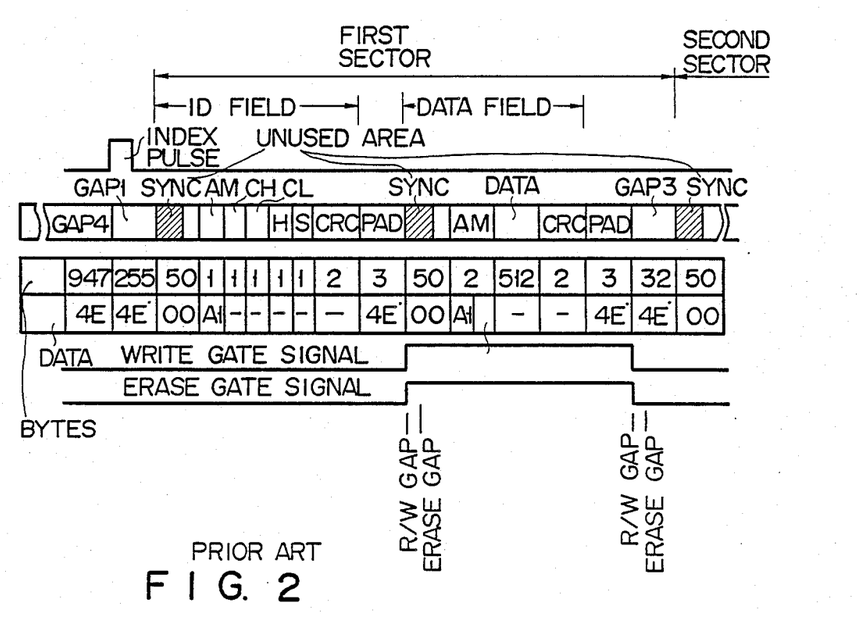
FIG. 2 is a diagram for explaining a conventional magnetic disk for use with a magnetic head with a pre-erase gap.

In the floppy disk soft sector track format disclosed in the aforementioned TOSHIBA REVIEW, the unused area is formed at the beginning of each of address and data fields in every sector, i.e., the preceding section of a sync area, as shown in FIG. 2. Stated another way, two unused areas are formed in each sector.

When an unused area is provided at the beginning of each of the address and data fields, then, as in the case of a commercially available magnetic disk apparatus using a tunnel-erase type magnetic head, even when the R/W gap and erase gap are driven simultaneously, accidental erasure of format data can be reliably prevented, thereby ensuring writing of data of a high quality. In practice, however, it is necessary to set the length of the unused area to more than 35 bytes, due to the possibility of errors in the manufacturing process, resulting in variations in the spacing between the R/W and erase gaps, as well as the possibility of unevenness in the rotation of disks.

A sector servo system, in which servo information is embedded in part of each sector of a disk, for the purpose of attaining a higher track density, and which utilizes this servo information for head positioning, is disclosed in U.S. Pat. No. 4,499,511 issued Feb. 12, 1985, U.S. Pat. No. 4,631,606 issued Dec. 23, 1986, and copending U.S. patent application Ser. No. 807,998 filed Dec. 12, 1985 and assigned to the same assignee as of this application. Greater recording capacity and higher density recording are made possible by applying this sector servo system to a floppy disk device using a magnetic head having a pre-erase gap, which is allowed to use a high density recording medium, such as a perpendicular magnetic recording medium. In the case of the sector servo system, the format of a floppy disk is of a hard sector type. Therefore, it is necessary to provide an unused area at the end portion of a data field in each sector, in addition to the aforementioned two unused areas, and a servo area in another area of the sector.

Figure 3A:
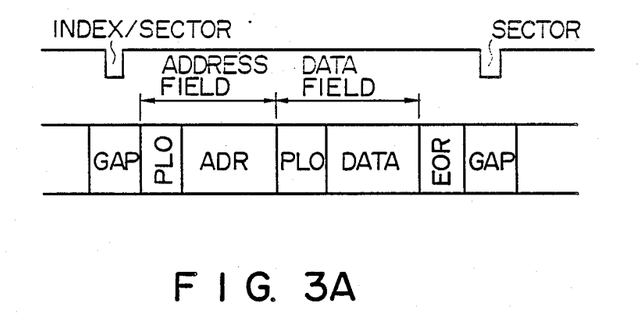
FIGS. 3A through 3B are diagrams for explaining a disk of a hard sector type.

FIG. 3A illustrates an example of the hard sector format, using a SMD (small module disk) interface or an ESDI (enhanced small disk interface). In the hard sector format, unlike in the soft sector format, format data is transferred to a disk drive by a disk controller. A sector pulse is generated from a disk by the disk device (disk drive). In FIG. 3A, "PLO" stands for a sync area used for locking a phase-locked oscillator, while "EOR38 stands for an area used for representing the end of record.

Figure 3B:
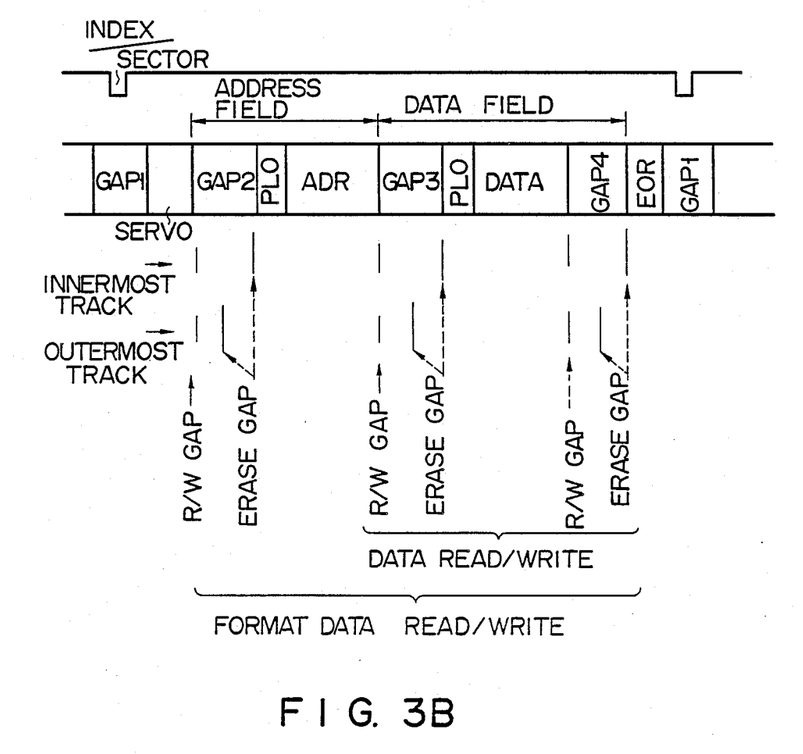

When the pre-erase head system is applied to this hard sector format, it is necessary to provide three unused areas in one sector, as is shown in FIG. 3B; namely, those formed at the beginning portion of the address field and at the beginning and end portions of the data field. These unused areas are indicated as $gap_1$, $gap_2$, and $gap_3$. In particular, the last unused area, $gap_3$, is necessary to prevent erasure of a sector detection mark provided in $gap_1$ that is formed at the beginning of each sector. The number of bytes corresponding to the spacing between the R/W gap and the erase gap varies between the innermost track and the outermost track. The number of bytes at the innermost track is largest, so that the length of each unused area is determined by taking into consideration the number of bytes corresponding to the head gap spacing at the innermost track.

Further, when the servo sector system is applied to this format, in addition to the three unused areas, a servo information area must be additionally provided between $gap_1$ and $gap_2$, as is shown in FIG. 3B. However, provision of this additional area significantly lowers the format efficiency of the disk. In particular, when the data storage capacity for one sector is 256 bytes, the data storage efficiency is below 50% and the reduction in the format efficiency cannot be neglected.

SUMMARY OF THE INVENTION

It is an object of this invention to provide a magnetic disk apparatus which uses a head having a pre-erase gap, which utilizes the sector servo system for head positioning, and which can avoid a decrease in the format efficiency of a magnetic disk.

According to this invention, a magnetic disk is divided into a plurality of sectors, and servo information is embedded in at least one of gaps provided in each sector in accordance with the spacing between an erase gap and a read/write gap of the head.

A magnetic disk apparatus according to this invention comprises a magnetic head having an erase gap which precedes a read/write gap. This magnetic disk apparatus performs the head positioning on a magnetic disk using the servo information read by the read/write gap and writes onto and reads from the magnetic disk by the read/write gap. To avoid a decrease in the format efficiency of the magnetic disk, the magnetic disk apparatus initiates data writing after the servo information is read by the read/write gap, and initiates data erasing using the erase gap prior to the beginning of data writing executed by the read/write gap, by a time corresponding to the spacing between the erase gap and the read/write gap on the outermost track of the disk. This magnetic disk apparatus terminates the data erasing by the erase gap prior to the completion of the data writing by the read/write gap, by a time corresponding to the spacing between these two gaps on each track.

DESCRIPTION OF THE PREFERRED EMBODIMENTS

Figure 4:
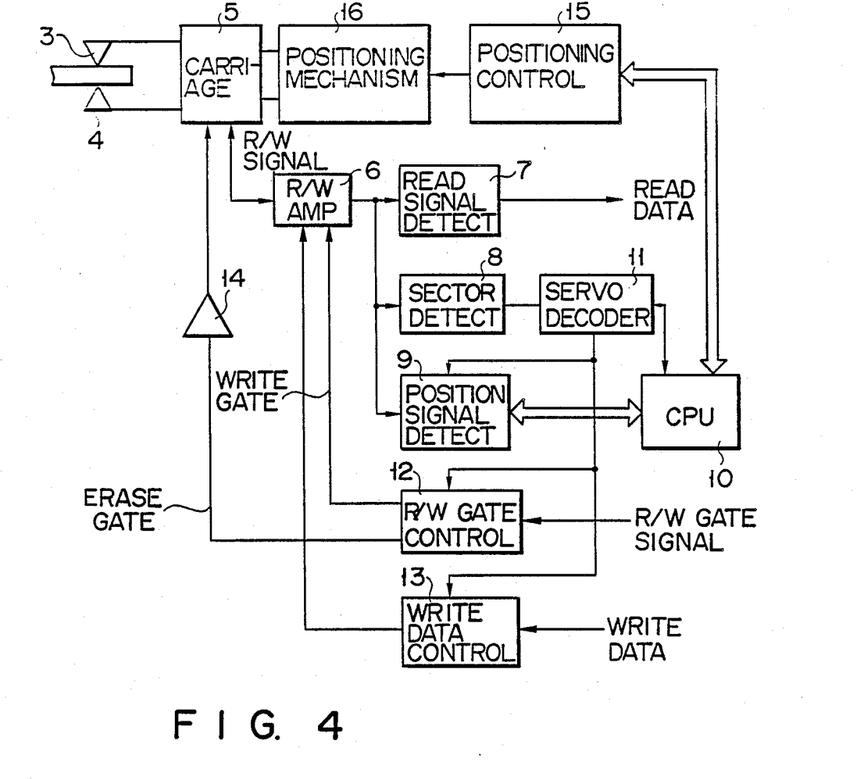
FIG. 4 shows an arrangement of a magnetic disk apparatus according to this invention.

FIG. 4 is a block diagram of a magnetic disk apparatus according to an embodiment of this invention. A pair of pre-erase type magnetic heads 4, which are disposed on double sides of a magnetic disk 3, each have the configuration as shown in FIG. 1. These magnetic heads 4 are moved to a selected location on the magnetic disk by a carriage 5 for reading data from or writing data on that location. A read signal from the head is input via carriage 5 to a read/write (R/W) amplifier 6 where it is amplified. The amplified signal is then applied to a read signal detector 7, a sector detector 8 and a position signal detector 9. Read signal detector 7 extracts data from the signal read from magnetic disk 3. Sector detector 8 detects the leading position of each servo sector of magnetic disk 3. Position signal detector 9 detects the position of head 4 with respect to disk 3 from the read servo information, and provides the detected position information to a microprocessor 10. Based on a sector pulse indicating the sector's leading position detected by sector detector 8, a servo decoder 11 generates a sync signal for extracting a position signal and provides an INDEX/SECTOR pulse, that indicates the beginning of a sector, to a R/W gate control circuit 12 and a write data control circuit 13. R/W gate control circuit 12 produces a gate signal for R/W amplifier 6 in response to the INDEX/SECTOR pulse and a R/W gate signal supplied from a disk controller (not shown). R/W gate controller 12 also produces an erase gate signal, which is amplified by a driver 14 and energizes the erase gap of magnetic head 4 via carriage 5. Write data control circuit 13 supplies data supplied from the disk controller to R/W amplifier 6 in response to the sector pulse from servo decoder 11. R/W amplifier 6 supplies the data to magnetic head 4 through carriage 5 in response to the write gate signal from R/W gate controller 12 so as to energize the R/W gap.

Microprocessor 10 detects the position of magnetic head 4 with respect to magnetic disk 3 based on the servo information supplied from position signal detector 9, and causes a positioning controller 15 to drive a positioning mechanism 16 for moving carriage 5. As a result, the magnetic head is positioned at a designated position on a selected track. The tracking servo for the magnetic head consists of a speed control for quickly moving the head near the target track and a position control for accurately positioning the head at the target track.

The recording format for each sector on a disk will be described with reference to FIGS. 6A through 6E.

Figure 6A:
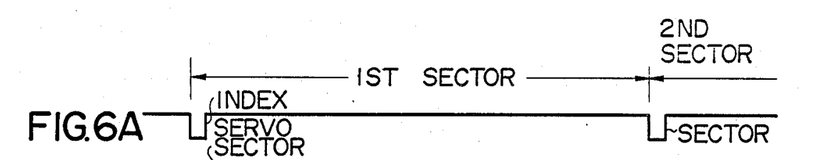
FIGS. 6A through 6E are diagrams for explaining a magnetic disk according to this invention.
Figure 6B:
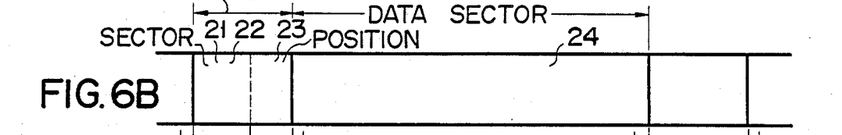
Figure 6C:
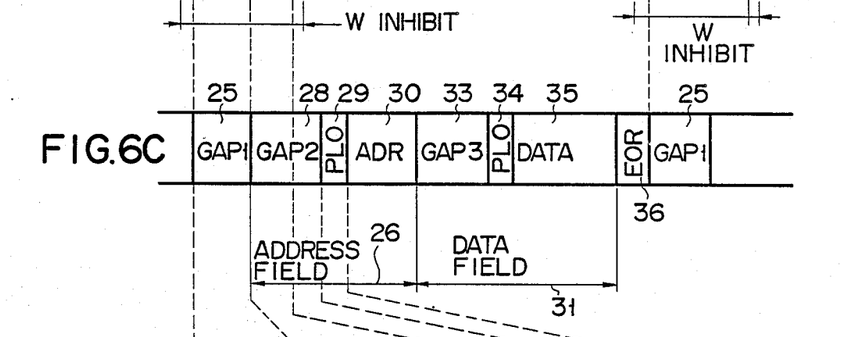

FIG. 6A illustrates an INDEX/SECTOR pulse that is obtained when a magnetic head, while moving on the magnetic disk, detects a sector detection mark of each sector. The pulse acquired from the first sector is particularly used as an INDEX pulse. As shown in FIG. 6B, each sector consists of a servo sector 21 and a data sector 24. Servo sector 21 consists of a sector information area 22 used for detecting the sector and a position information area 23 used for positioning the head. Data read/write is inhibited in servo sector 21 and the preceding and succeeding narrow regions thereof. FIG. 6C illustrates a track format of data that is supplied from the disk controller in synchronism with the INDEX/SECTOR pulse and is written on a data track. This format consists of a $gap_1$ 25, an address field 26, a data field 31 and an EOR ($gap_4$) 36. Address field 26 consists of a $gap_2$ 28, a PLO sync area 29 and an address (ADR) area 30. $Gap_2$ 28 is an unused area provided according to the spacing between the R/W gap and erase gap. Data field 31 consists of $gap_3$ 33, which is formed according to the aforementioned head gap spacing, a PLO sync area 34 and a data area 35.

In general, the disk controller sets the number of bytes of PLO sync area of address field 26 to be equal to that of PLO sync area of data field 31, so that $gap_2$ 28 and $gap_3$ 33 have the same length. As mentioned earlier, the length of $gap_2$ and $gap_3$ is at least 35 bytes when the head gap spacing is 200 μm and the recording density is 35 KBPI. In consideration of the possibility of manufacturing error in the head gap spacing and the rotational variation of a disk, the actual head-gap spacing would correspond to about 19 bytes at the outermost track and to about 37 bytes at the innermost track. Accordingly, the length of $gap_2$ and $gap_3$ must be set to cover at least 37 bytes.

The unused areas $gap_2$ and $gap_3$ cannot be narrowed even when the energizing timing for the erase gap (the erase gate signal goes low) and the energizing timing for the R/W gap (the write gate signal goes low) are changed. This is because whether or not data is written in data area 35 depends on whether or not address data recorded in address area 30 coincides with a designated address. In data writing, the write gate signal becomes low when the R/W gap leaves address area 30. If $gap_3$ 33 is too narrow, the erase gap would reach data area 35 at this time, disabling the rewriting of PLO sync area 34.

If the disk controller can set $gap_2$ 28 and $gap_3$ 33 to have different bytes, it appears that $gap_2$ 28 can be shortened by changing the energizing timings of the erase gap and R/W gap. However, if $gap_2$ 28 is narrowed the erase gap will be energized when the R/W gap lies above $gap_1$ 25. When the erase gap is energized while the R/W gap reads $gap_1$ 25, the transition originated from the erase action would be picked up by the R/W gap, thus making it difficult to detect a sector pulse or an AGC signal from $gap_1$. Therefore, it is difficult to narrow $gap_2$ 28.

Figure 6D:
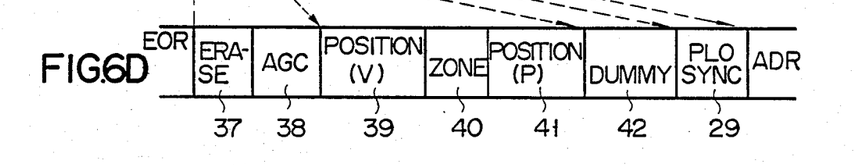
Figure 6E:
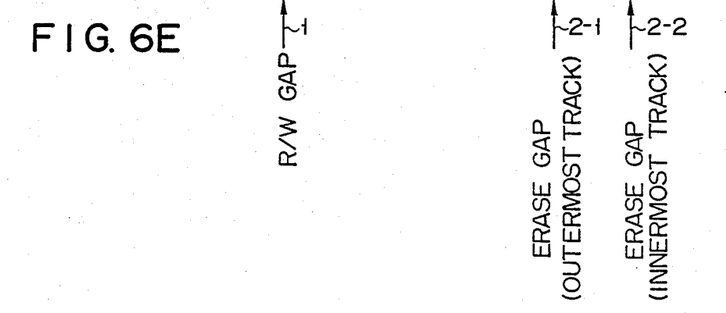

FIG. 6D is an enlarged view of $gap_1$ 25 and address field 26. $Gap_1$ 25 coincides with sector information area 21 of servo sector 22 and consists of an erase area 37 for detecting a sector pulse and an AGC area 38 in which an AGC signal used to maintain the amplitude of a read signal at a constant level is recorded. $Gap_2$ 28 and $gap_3$ 33 have a length of about 37 bytes, whose leading areas of approximately 17 bytes are a non-erasable unused area. Therefore, assuming that data erase is initiated by the erase gap immediately after the R/W gap passes through AGC area 38, then the timing for initiating the data erase by the erase gap preceding the R/W gap differs between the innermost track and the outermost track of the disk, as shown in FIG. 6E. In other words, immediately after the R/W gap 1 passes through AGC area 38, the erase gap 2 is located at a position indicated at "2-1" at the outermost track and is located a position indicated at "2-2" at the innermost track. A unusable area, namely a dummy area 42, is provided in $gap_2$ 28 due to the different positions 2-1 and 2-2 of erase gap 2. Accordingly, the area from the end of AGC area 38 to the beginning of dummy area 42 is not erasable by the erase gap. According to this invention, servo information is embedded in this area and format data is written by the R/W gap after this R/W gap passes the non-erasable area.

As illustrated in FIG. 6D, the servo information area consists of an area 39 in which position information for controlling the head speed during a speak operation is recorded, a zone area 40 for discriminating a data zone and a guard zone and providing an index pulse, and a position information area 41 in which position information used for accurately positioning the head when the head reaches near a target track is recorded.

Figure 7A:
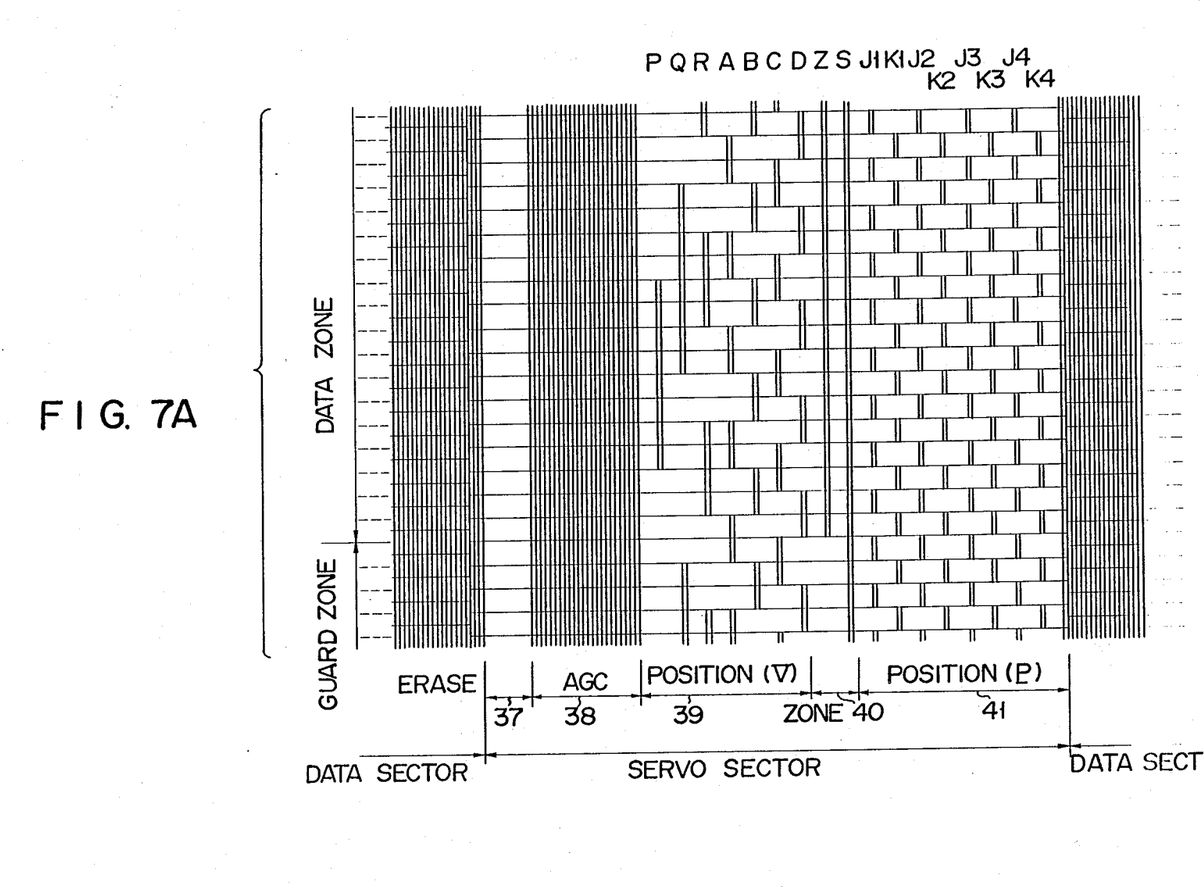
FIGS. 7A and 7B show in detail the servo information shown in FIGS. 6B–6D.
Figure 7B:
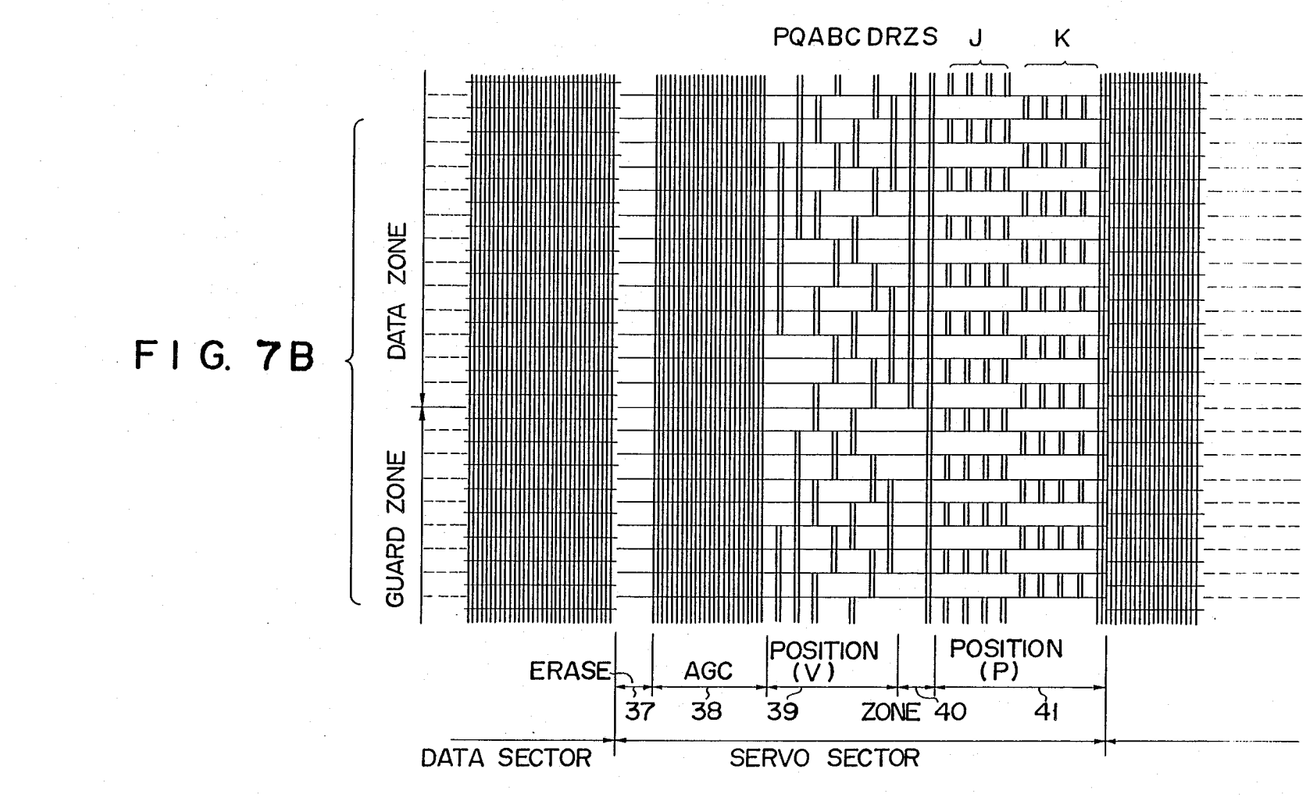

FIGS. 7A and 7B illustrates in detail servo information area 23 formed in $gap_2$ 28.

In FIG. 7A, position information area 39 for speed control has position information patterns P, Q, R, A, B, C and D formed therein, as disclosed in the aforementioned U.S. Pat. Nos. 4,499,511 and 4,631,606 and copending U.S. patent application Ser. No. 807,998. Zone area 40 has a pattern Z for discriminating the data zone and guard zone. For the first servo sector, in addition to pattern Z, an index pattern S that is used to generate an index pulse is formed in zone area 40. Four pairs of one-phase dibit patterns $J_i$, $K_i$ (i=1, 2, 3, 4) are formed in position information area 41 adapted for accurate positioning control. Burst patterns may replace the dibit patterns for the purpose of accurate positioning control as shown in FIG. 7B.

Figure 8:
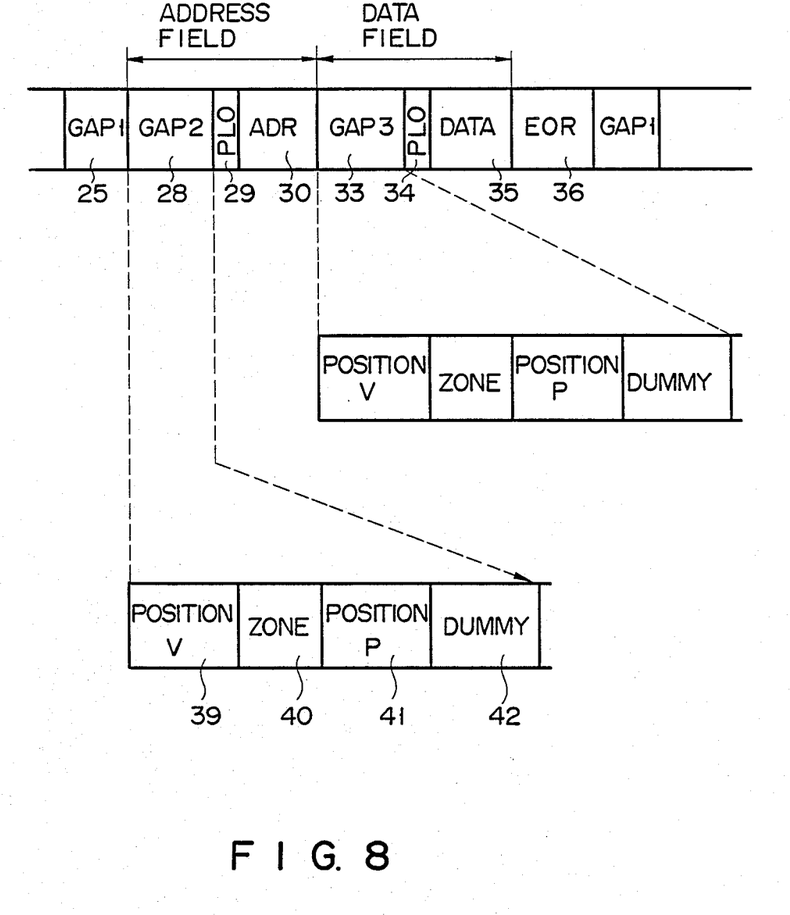
FIG. 8 shows a modification of the magnetic disk of this invention.

The speed control servo information is used only for the speak operation for moving the head to a target track; it is not used for a format-data writing operation. Naturally, the erase-originated transition does not occur even if the erase gap is energized when the R/W gap lies above speed control servo information area 39 at the time of format-data writing. The erase-originated transition influences a signal read by the R/W gap, generally within a range of 4–6 bytes. If the length of speed control servo information area 39 is set greater than 6 bytes, therefore, it is possible to avoid the influence of the transition on the signals read from the succeeding zone area 40 and accurate positioning control servo information area 41. The position information area may be formed not only in the first gap, $gap_2$ 28, of address field 26 but also in $gap_3$ 33 of data field 31 as shown in FIG. 8. The provision of the position information area in the address field and data field is effective in improving the head positioning accuracy.

The basic operation of a magnetic disk apparatus for the above-described magnetic disk will now be explained, referring to FIGS. 9A to 9E. Since these FIGS. 9A–9C respectively correspond to FIGS. 6A–6C, their explanation will be omitted to avoid descriptive redundancy.

Figures 9A, 9B:
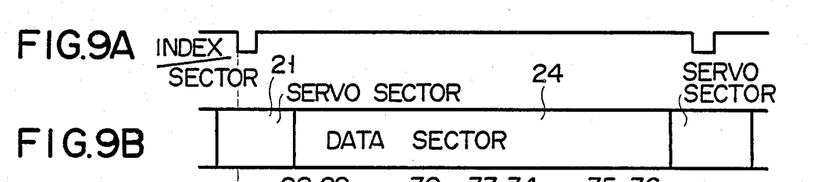
FIGS. 9A through 9E are diagrams for explaining the operation of the magnetic disk apparatus according to this invention.
Figure 9C:
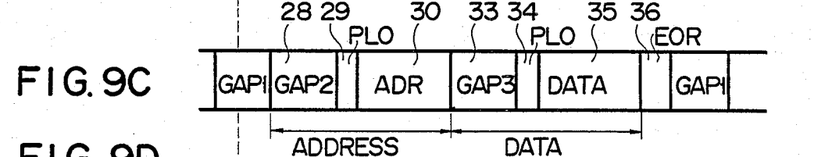
Figure 9D:
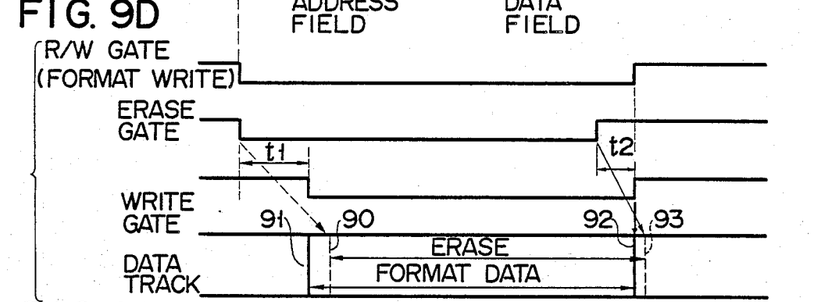

FIG. 9D illustrates the operation for writing format data. The R/W gate signal from the disk controller goes low in synchronism with the INDEX/SECTOR pulse, thus indicating a format write mode. This format write mode is initiated immediately after the R/W gap reads out the AGC signal from the AGC area. The erase gate signal goes low in synchronism with the R/W gate signal so as to energize the erase gap. As mentioned earlier, the erase gap at this stage is positioned within dummy area 42 of FIG. 6D. Consequently, the data erase is initiated from the position indicated by dot line 90 on the data track. The write gate signal becomes low with a delay of t1 to energize the R/W gap after the erase gate signal becomes low. Accordingly, the format data writing is initiated from the position indicated by solid line 91 on the data track. Consequently, the servo data is not erased by the R/W gap and the erase gap, and after PLO sync areas 29 and 34 and address field 30 are erased by the erase gap, new PLO sync signal and address data can be written by the R/W gap. This prevents the occurrence of the overwrite modulation. As compared with the case where the erase gap and R/W gap are simultaneously energized, the format efficiency can be improved by the bytes corresponding to time t1, which corresponds to the spacing between the erase gap and R/W gap. The number of bytes corresponding to time t1 differs depending on a data track of the disk. This byte number is minimum at the outermost track and is maximum at the innermost track. Time t1 may be set to correspond to the number of bytes corresponding to the spacing between the erase gap and the R/W gap at the outermost track.

In the format write mode, the R/W gate signal goes high at the end of data area 35. In synchronism with this signal level transition, the write gate signal goes high. The erase gate signal goes high earlier, by t2, than the write gate signal. As compared with the case where the erase and write gate signals are simultaneously made high, therefore, the format efficiency can be improved by the bytes corresponding to t2. Since data write terminates at the position indicated by solid line 92 on the data track and data erase terminates at the position indicated by dot line 93, gap$_4$ of the data field can be shortened. Time t2 may be set in accordance with the number of bytes corresponding to the spacing between the erase gap and the R/W gap on each data track.

Figure 9E:
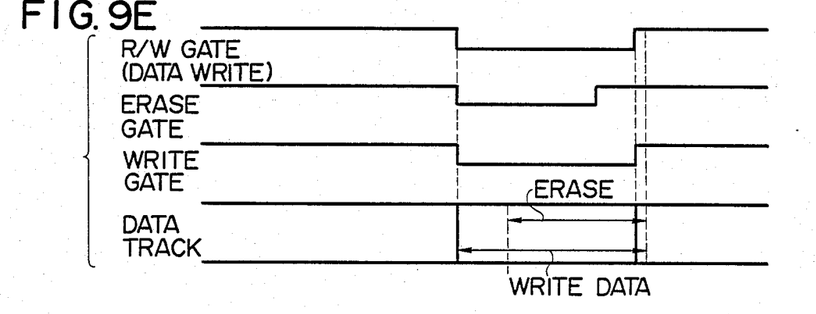

FIG. 9E shows a timing chart for writing data. When address data read by the R/W gap coincides with a designated address, the R/W gate signal goes low, thus setting the operation to the data write mode. In synchronism with the R/W gate signal, the erase gate signal and the write gate signal become low, thus energizing the erase gap and the R/W gap. It should be noted that, even when the erase gap and R/W gap are simultaneously energized, both gaps at this stage lie above gap$_3$ 33 (unused area) of the data field. Since data erase starts immediately before PLO sync area 34 on the data track, the overwrite modulation in PLO sync area 34 and data area 35 can be avoided. The low-to-high switching of the R/W gate signal, erase gate signal and write gate signal may be effected in the same manner as in the format write mode.

When servo information is embedded in the data field as shown in FIG. 8, in order to avoid the erasing of the servo information, the write gate signal should be set low with a delay after the erase gate signal becomes low, as is the case in the format write mode.

As mentioned above, the unused area provided at the end of the data field can be reduced by setting the erase gate signal high on each track of the disk prior to setting the write gate signal high, by a time corresponding to the number of bytes that corresponds to the spacing between the erase gap and the R/W gap. This number is minimum at the outermost track and is maximum at the innermost track. It is not practical to change the termination timing of data erase for each of the tracks.

It is, however, practical to divide the data tracks of a disk into a plurality of groups and vary the termination timing of the erasing action for each track group. The following explains the case where the data tracks are divided into four groups.

Figure 10A:
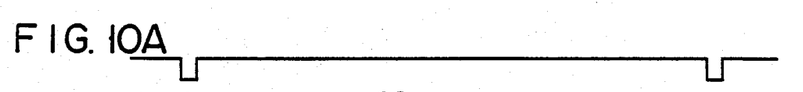
FIGS. 10A through 10G are diagrams for explaining the operation of the magnetic disk apparatus in a format write mode in the case where data tracks of a disk are divided into four groups.
Figure 10B:
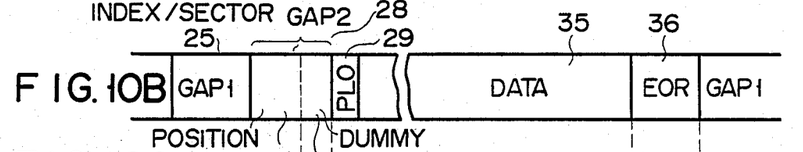
Figure 10C:
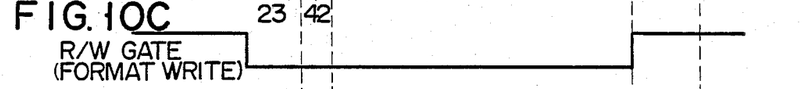
Figure 10D:
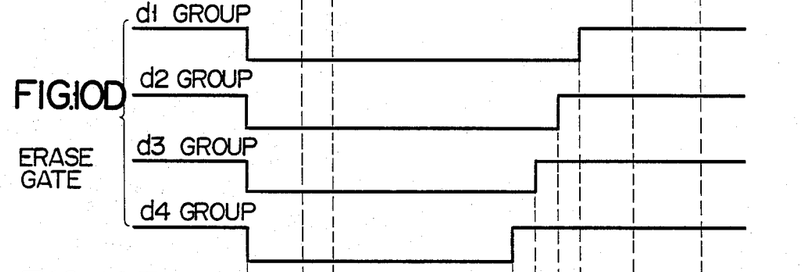
Figure 10E:
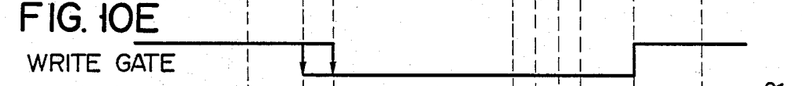
Figures 10F, 10G:
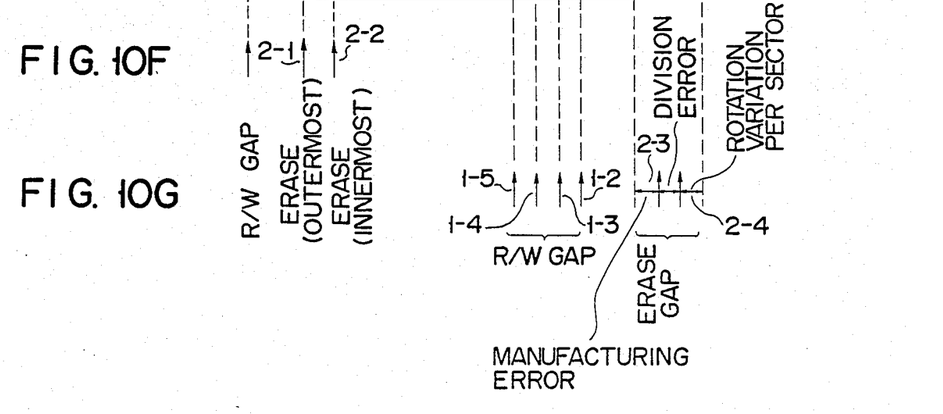

FIGS. 10A through 10G are diagrams for explaining the operation of the magnetic disk apparatus in the format write mode. As shown in FIG. 10C, the format write mode is initiated immediately after the R/W gap finishes reading the AGC area of gap$_1$ 25, and continues until the R/W gap reaches the end of data area 35. In synchronism with the beginning of the format write mode, the erase gate signal becomes low to initiate the erasing action. The same operation sequence applies to every track. At this time, as shown in FIG. 10F, the R/W gap is positioned at the leading edge of gap$_2$ 28, while the erase gap is positioned at a location indicated at "2-1" on the outermost track and at a location indicated at "2-2" on the innermost track. Both of locations 2-1 and 2-2 lie within dummy area 42 of gap$_2$ 28. PLO sync area 29 can be erased without erasing the position information. The write operation is initiated immediately after the R/W gap finishes reading of position information 23 and terminated when the R/W gap reaches the end of data area 35. This write operation needs only to start when the R/W gap lies above dummy area 42, and thus does not require a strict write start timing.

The data tracks are separated into the first group d1, second group d2, third group d3 and fourth group d4 as viewed from the outer periphery of the disk. The bytes corresponding to the spacing between the erase gap and the R/W gap on the outermost track are about 17 bytes, whereas those on the innermost track are about 35 bytes. Therefore, there is a difference of about 18 bytes between the innermost and outermost tracks. This difference corresponds to the number of bytes between locations 2-1 and 2-2 of the erase gap in FIG. 10F. When the data tracks are separated into four groups, there is a difference of about 4.5 bytes between the innermost and outermost tracks in each track group. This difference or error can be reduced by increasing the number of track groups.

As shown in FIG. 10D, the closer to the innermost track the track groups are, the earlier the completion of the data erasing. The difference in the timings of termination of the data erase between track groups corresponds to 4.5 bytes. Since the spacing between the erase gap and the R/W gap may involve a manufacturing error, it is necessary that the terminating position of the data erase be determined in consideration of this error. FIG. 10G shows the positions of the erase and R/W gaps when data erase is completed. At the end of the data erase, the R/W gap is at position 1-2 in group d1, at position 1-3 in group d2, at position 1-4 in group d3 and at position 1-5 in group d4. If there is no manufacturing error in the spacing between the erase and R/W gaps, the erase gap comes between positions 2-3 and 2-4. The location of the erase gap at the end of data erase operation is determined in consideration of this error as well as an error, caused by dividing the data tracks into four groups, and a variation in disk rotation per sector. Even if the manufacturing error exists, the data erasing operation does not end within data area 35.

Figure 11A:
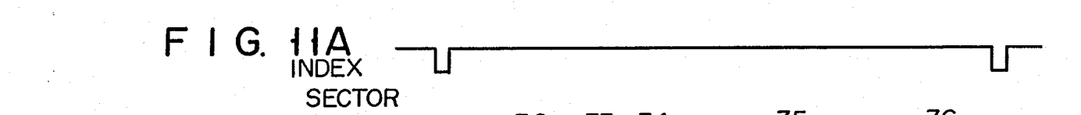
FIGS. 11A through 11E are diagrams for explaining the operation of the magnetic disk apparatus in a data write mode in the case where data tracks of a disk are divided into four groups.
Figure 11B:
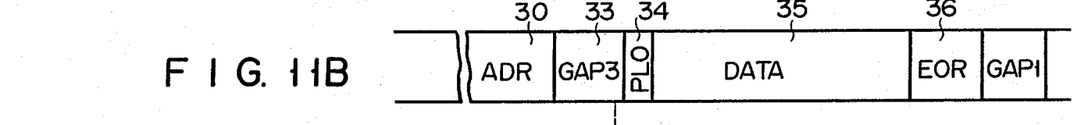
Figure 11C:
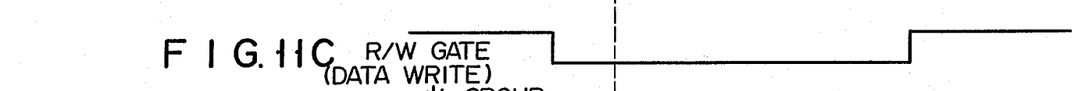
Figure 11D:
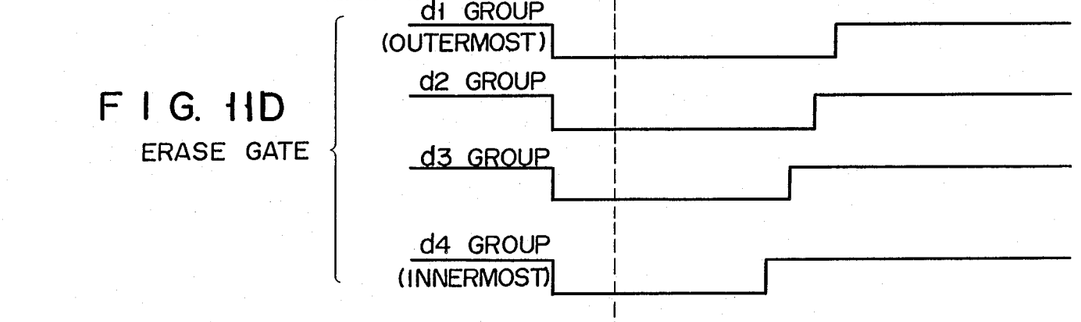

FIGS. 11A through 11E illustrate the operation of the magnetic disk apparatus in the data write mode. When the R/W gap reads data of address area 30 and this address data of this area coincides with a designated address, the R/W gate signal becomes low as shown in FIG. 11C. The erase gate signal for each group also becomes low in synchronism with the R/W gate signal as shown in FIG. 11D. Like in the case of the format write mode, the inner the track groups, the earlier the completion of data erase. When the servo information is not provided in the first gap$_2$ 33 of the data field, the write gate signal needs only to be set low during the write mode (see FIG. 11E). When the servo information is provided in gap$_3$ of the data field as shown in FIG. 8, the write gate signal should only be set low after the servo information is read out.

Although the erase gate signal and write gate signal are generated by R/W gate controller 12 of FIG. 4, setting of the timings for energizing and deenergizing the erase and R/W gaps is attained by measuring time in synchronism with the INDEX/SECTOR pulse.

Figure 5:
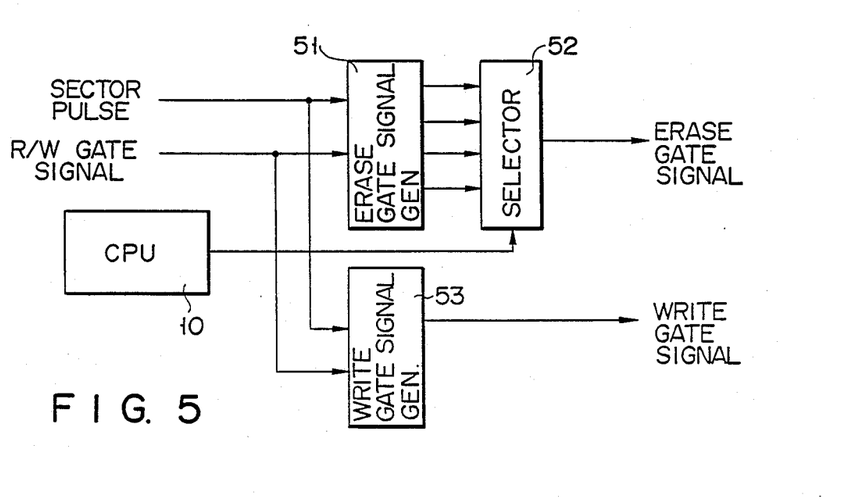
FIG. 5 is a block diagram illustrating an arrangement of a read/write gate controller.
Figure 11E:
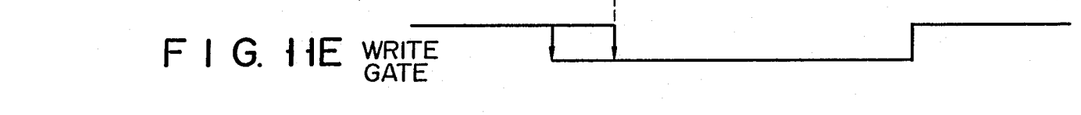

The structure of R/W gate controller 12 is illustrated in FIG. 5. R/W gate controller 12 has an erase gate signal generator 51, which simultaneously generates four erase gate signals having widths that respectively correspond to the four data track groups as shown in FIGS. 10D and 11D, in response to the sector pulse and the R/W gate signal from the disk controller. These erase gate signals are supplied to a selector 52. A CPU 10 causes selector 52 to select a proper erase gate signal in accordance with the head's present track position on the disk. A write gate signal generator 53 generates a write gate signal as shown in FIGS. 10E and 11E, in response to the sector pulse and R/W gate signal. The disk controller sets the operation to the format write mode or data write mode, in response to the sector pulse from the disk drive.

What is claimed is:

1. In a magnetic disk apparatus comprising a single magnetic head having a read-write gap and an erase gap with a predetermined spacing therebetween, and using a magnetic disk having servo information adapted for positioning said head on said magnetic disk, said erase gap preceding said read/write gap with respect to the rotational direction of said magnetic disk, said magnetic disk being divided into a plurality of sectors each having a data field in which data is written and an address field in which address information is written, a method of driving said read/write gap and said erase gap, comprising the steps of:
    energizing said read/write gap to record servo information on a gap provided at the beginning of each said data field and said address field, said gap having a length corresponding to said spacing between said read/write gap and said erase gap;
    energizing said read/write gap to initiate recording of data onto a track of said magnetic disk, after said servo information has been read out by said read/write gap;
    energizing said erase gap to erase said track prior to the initiation of recording of data by said read/write gap; and
    deenergizing said erase gap to terminate the erasing of said track prior to the termination of recording of data by said read/write gap.

2. The method according to claim 1, wherein tracks of said magnetic disk are divided into a plurality of groups from the outermost track to the innermost track; and the timing for terminating the erasing of said track by said erase gap differs for each of said track groups.

3. The method according to claim 1, wherein the erasing of said track by said erase gap is initiated prior to the initiation of recording of data by said read/write gap, by a time corresponding to said spacing between said read/write gap and said erase gap at the outermost track of said disk; and the erasing of said track by said erase gap is terminated prior to the termination of recording of data by said read/write gap, by a time corresponding to said spacing between said read/write gap and said erase gap on said track.

4. The method according to claim 2, wherein, in each of said track groups, the erasing of said track by said erase gap is terminated prior to the termination of recording data onto said track, by a time corresponding to said spacing between said read/write gap and said erase gap on the innermost track of the track group.

5. The method according to claim 1, wherein said gap in which said servo information is formed includes a first area, in which speed control position information used for moving said head means to a target track is formed; a second area, in which information used for discriminating between a data zone and a guard zone of said disk is formed; and a third area, in which position information used for precisely positioning said head means on said target track is formed.

6. The method according to claim 5, wherein said first area is situated at a position which is reached by said head means earlier than is said third area.

7. The method according to claim 1, wherein said servo information is formed in said gaps in said address field and said data field.

8. A magnetic disk for use in a magnetic disk apparatus comprising magnetic head means having a read/write gap and an erase gap preceding said read/write gap, with a predetermined spacing therebetween, with respect to the rotational direction of said disk, and positioning said head means on said magnetic disk on the basis of a sector servo system, comprising:
    a plurality of sectors each having a data field and an address field;
    a gap provided at the beginning of each of said data field and said address field in each of said sectors, and having a length corresponding to said spacing between said read/write gap and said erase gap; and
    servo information formed in at least said gap provided at the beginning of each of said data field and said address field and adapted for positioning said head means on said disk.

9. The disk according to claim 8, wherein each of said sectors includes a sector information area in which sector information followed by said address field and used for detecting said sector is recorded, said address field includes an address area in which address information of said sector is recorded, and a sync signal area used for recording a sync signal, said sync signal area being provided between said address field and said gap, and said gap includes a servo information area in which servo information is formed, and a dummy area provided between said servo information area and said sync signal area.

10. The disk according to claim 8, wherein said gap in which said servo information is formed includes a speed control position information area in which speed control position information used for moving said head means to a target track is formed, a zone area in which information used for discriminating between a data zone and a guard zone of said disk is formed, and a precise position information area in which position information used for precisely positioning said head means on the target track is formed.

11. The disk according to claim 10, wherein said speed control position information area is situated at a position which is reached by said head means earlier than is said precise position information area.

12. The disk according to claim 8, wherein said servo information is formed in said gaps of said address field and said data field.

* * * * *